(12) United States Patent
Kim et al.

(10) Patent No.: US 10,319,962 B2
(45) Date of Patent: Jun. 11, 2019

(54) SECONDARY BATTERY PACK HAVING BATTERY CELLS MOUNTED IN CARTRIDGE FRAME (71) Applicant: LG CHEM, LTD., Seoul (KR)

(72) Inventors: Han Chul Kim, Daejeon (KR); Dong Cheol Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 485 days.

(21) Appl. No.: 15/024,919

(22) PCT Filed: Sep. 19, 2014

(86) PCT No.: PCT/KR2014/008736
§ 371 (c)(1),
(2) Date: Mar. 25, 2016

(87) PCT Pub. No.: WO2015/046821
PCT Pub. Date: Apr. 2, 2015

(65) Prior Publication Data
US 2016/0226038 A1    Aug. 4, 2016

(30) Foreign Application Priority Data
Sep. 30, 2013 (KR) ........................ 10-2013-0116218

(51) Int. Cl.
H01M 2/10       (2006.01)
H01M 10/42      (2006.01)
(Continued)

(52) U.S. Cl.
CPC ....... *H01M 2/1022* (2013.01); *H01M 2/1061* (2013.01); *H01M 2/1066* (2013.01);
(Continued)

(58) Field of Classification Search
CPC ......... H01M 10/0525; H01M 10/0585; H01M 10/425; H01M 10/4257; H01M 10/052;
(Continued)

(56) References Cited

U.S. PATENT DOCUMENTS 5,962,157 A     10/1999 Kang
2003/0146734 A1  8/2003 Kozu et al.
(Continued)

FOREIGN PATENT DOCUMENTS

CN    1652372 A    8/2005
CN    1841836 A    10/2006
(Continued)

OTHER PUBLICATIONS

International Search Report (PCT/ISA/210) issued in PCT/KR2014/008736, dated Dec. 16, 2014.

*Primary Examiner* — Jimmy Vo
(74) *Attorney, Agent, or Firm* — Birch, Stewart, Kolasch & Birch, LLP (57) ABSTRACT A secondary battery pack is provided that includes a battery cell array configured to have a structure in which two or more battery cells, each of which includes electrode terminals and a thermally bonded surplus portion formed at the side thereof at which the electrode terminals are formed, are arranged side by side, a protection circuit module (PCM), the PCM being loaded on the thermally bonded surplus portions of the battery cells, a cartridge frame including two or more battery cell location parts for fixing the two battery cells, respectively, each of the battery cell location parts being formed in a frame shape, and a sheathing label attached to the cartridge frame such that the sheathing label wraps the cartridge frame in a state in which the battery cells, to which the PCM is connected, are fixed in the cartridge frame.

18 Claims, 9 Drawing Sheets (51) Int. Cl.
*H01M 2/20* (2006.01)
*H01M 10/0525* (2010.01)
*H01M 10/0585* (2010.01)
*H01M 10/052* (2010.01)

(52) U.S. Cl.
CPC ....... *H01M 2/204* (2013.01); *H01M 10/0525* (2013.01); *H01M 10/0585* (2013.01); *H01M 10/425* (2013.01); *H01M 10/4257* (2013.01); *H01M 10/052* (2013.01); *H01M 10/4221* (2013.01); *H01M 2220/30* (2013.01)

(58) Field of Classification Search
CPC ........... H01M 10/4221; H01M 2/1022; H01M 2/1061; H01M 2/1066; H01M 2/204
See application file for complete search history.

(56) References Cited

U.S. PATENT DOCUMENTS

| | | |
|---|---|---|
| 2006/0035141 A1 | 2/2006 | Lee |
| 2007/0072066 A1 | 3/2007 | Yoon et al. |
| 2012/0270074 A1 | 10/2012 | Koh |
| 2013/0034750 A1 | 2/2013 | Choi et al. |
| 2013/0057775 A1 | 3/2013 | Nishioka et al. |
| 2014/0023885 A1 | 1/2014 | Choi et al. |
| 2014/0147707 A1 | 5/2014 | Choi et al. |

FOREIGN PATENT DOCUMENTS

| | | |
|---|---|---|
| CN | 202721220 U | 10/2006 |
| CN | 102751454 A | 10/2012 |
| CN | 203218397 U | 9/2013 |
| EP | 2 515 358 A1 | 10/2012 |
| JP | 10-112336 A | 4/1998 |
| JP | 2001-256937 A | 9/2001 |
| JP | 2006-278326 A | 10/2006 |
| JP | 2013-80569 A | 10/2012 |
| KR | 10-0876458 B1 | 12/2008 |
| KR | 10-2013-0016035 A | 2/2013 |
| KR | 10-2013-0062543 A | 6/2013 |
| TW | 2013303360 A1 | 7/2013 |
| WO | WO 2013/024990 A2 | 2/2013 |

SECONDARY BATTERY PACK HAVING BATTERY CELLS MOUNTED IN CARTRIDGE FRAME

TECHNICAL FIELD

The present invention relates to a secondary battery pack including battery cells mounted in a cartridge frame and, more particularly, to a secondary battery pack including a battery cell array configured to have a structure in which two or more battery cells, each of which includes electrode terminals formed at one side thereof and a thermally bonded surplus portion formed at the side thereof at which the electrode terminals are formed, are arranged side by side, a protection circuit module (PCM) configured to have a structure including a protection circuit board (PCB) having a protection circuit formed thereon, an external input and output terminal connected to the protection circuit of the PCB, and a PCM case, in which the PCB is mounted, the PCM being loaded on the thermally bonded surplus portions of the battery cells in a state in which the PCM is electrically connected to the battery cells, a cartridge frame including two or more battery cell location parts for fixing the two battery cells, respectively, each of the battery cell location parts being formed in a frame shape corresponding to an outer circumference of a corresponding one of the battery cells, and a sheathing label attached to the cartridge frame such that the sheathing label wraps the cartridge frame in a state in which the battery cells, to which the PCM is connected, are fixed in the cartridge frame.

BACKGROUND ART

Depending upon the kind of an external device in which a secondary battery is used, the secondary battery may be configured to have a detachable type structure in which the secondary battery can be easily inserted into and removed from the external device or to have an embedded type structure in which the secondary battery is embedded in the external device. For example, the secondary battery can be inserted or removed into or from devices, such as laptop computers, as needed. On the other hand, devices, such as some kinds of mobile phones, MPEG Audio Layer-3 (MP3) players, tablet PCs, and smart pads, require an embedded type battery pack due to the structure or capacity thereof.

Meanwhile, various kinds of combustible materials are contained in a lithium secondary battery, which has been increasingly used in recent years. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), for effectively controlling an abnormal state of the lithium secondary battery, such as overcharge of the lithium secondary battery or overcurrent in the lithium secondary battery, are connected to a battery cell.

Preferably, the secondary battery is manufactured so as to have as small a size and weight as possible. For this reason, a prismatic battery or a pouch-shaped battery, which has a small weight to capacity ratio, is usually used as a battery cell of the secondary battery. In particular, much interest is currently focused on the pouch-shaped battery, which uses an aluminum laminate sheet as a sheathing member, since the pouch-shaped battery is lightweight and the manufacturing cost of the pouch-shaped battery is low.

When a battery module or a battery pack is manufactured using pouch-shaped batteries as described above, however, various difficulties and problems are caused during connection between electrode terminals of the pouch-shaped batteries by welding. In addition, a pouch-shaped battery case has an advantage in that the pouch-shaped battery case easily cracks when external impact is applied to the pouch-shaped battery case, for example the pouch-shaped battery case drops or vibrates, due to the structural characteristics of the pouch-shaped battery case.

In order to solve the above problems, research has been conducted into a structure in which a cell cover is mounted at the top and bottom of a pouch-shaped battery cell, a structure in which a cartridge for fixing a pouch-shaped battery cell is used, and a structure in which two or more battery cells are connected to each other using an adhesive tape. In these structures, however, the number of parts is increased with the result that manufacturing cost is increased and a manufacturing processability is lowered. In addition, the volume of the battery pack or the battery module in which the pouch pouch-shaped battery cells are connected is increased.

Consequently, there is a high necessity for a battery pack having a compact structure and exhibiting structural stability while solving the above problems. In addition, there is a high necessity for a battery pack having a large capacity to size ratio according to a trend of miniaturizing and thinning a device.

DISCLOSURE

Technical Problem

Therefore, the present invention has been made to solve the above problems and other technical problems that have yet to be resolved.

Specifically, it is an object of the present invention to provide a secondary battery exhibiting high structural stability against external impact.

It is another object of the present invention to provide a secondary battery that is capable of improving structural stability of a battery pack without the increase of overall volume of the battery pack when battery cells are connected to constitute the battery pack.

Technical Solution

In accordance with one aspect of the present invention, the above and other objects can be accomplished by the provision of a secondary battery pack including a battery cell array configured to have a structure in which two or more battery cells, each of which includes electrode terminals formed at one side thereof and a thermally bonded surplus portion formed at the side thereof at which the electrode terminals are formed, are arranged side by side, a protection circuit module (PCM) configured to have a structure including a protection circuit board (PCB) having a protection circuit formed thereon, an external input and output terminal connected to the protection circuit of the PCB, and a PCM case, in which the PCB is mounted, the PCM being loaded on the thermally bonded surplus portions of the battery cells in a state in which the PCM is electrically connected to the battery cells, a cartridge frame including two or more battery cell location parts for fixing the two battery cells, respectively, each of the battery cell location parts being formed in a frame shape corresponding to an outer circumference of a corresponding one of the battery cells, and a sheathing label attached to the cartridge frame such that the sheathing label wraps the cartridge frame in a state in which the battery cells, to which the PCM is connected, are fixed in the cartridge frame.

That is, in the secondary battery pack according to the present invention, the battery cells are located in the cartridge frame such that an outer circumference of the secondary battery pack is protected by the cartridge frame, thereby improving structural strength of the secondary battery pack.

In addition, when the battery cells are located in the respective battery cell location parts of the cartridge frame, the battery cells are isolated from each other to prevent interference between the battery cells, thereby improving safety of the secondary battery pack.

Each of the battery cells may be a pouch-shaped battery cell configured to have a structure in which an electrode assembly is mounted in a case made of a laminate sheet comprising a metal layer and a resin layer and an outer circumference of the case is sealed.

Specifically, each of the battery cells may be a pouch-shaped battery cell configured to have a structure in which an electrode assembly of a cathode/separator/anode structure is received in a battery case together with an electrolyte in a sealed state. For example, each of the battery cells may be a plate-shaped battery cell configured to have an approximately rectangular hexahedral structure having a small thickness to width ratio. Generally, the pouch-shaped battery cell includes a pouch-shaped battery case. The battery case is configured to have a laminate sheet structure in which an outer coating layer formed of a polymer resin exhibiting high durability, a barrier layer formed of a metal material that is capable of blocking moisture or air, and an inner sealant layer formed of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at an upper inner surface and/or a lower inner surface of a two-unit member and upper and lower contact regions of the outer circumference of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, the battery case may be configured to have a structure in which an electrode assembly is received in a receiving part formed at an upper inner surface and/or a lower inner surface of a one-unit member and the upper and lower contact regions of the outer circumference of the battery case are sealed by thermal bonding.

In the pouch-shaped battery cell, an insulating tape is generally attached to the sealed portion of the pouch-shaped battery cell for insulation. In the secondary battery pack according to the present invention, on the other hand, the cartridge frame is formed of an insulative material and the battery cells are located in the cartridge frame. Consequently, it is possible to achieve insulation of the sealed portion without attachment of an additional insulating tape.

The battery cells may be configured to have the same structure such that a space can be optimally utilized when the battery cells are arranged. In addition, each of the battery cells may be configured to have a plate-shaped rectangular structure such that the volume of the battery cells is maximized in a limited space when the battery cells are arranged, thereby providing a high capacity. The battery cells may be arranged such that one side of one of the battery cells and one side of another of the battery cells are adjacent to each other in a state in which the electrode terminals of the battery cells are disposed in the same direction.

In this case, the cartridge frame may be configured to have a structure including an outer frame, at which a thermally bonded outer surplus portion positioned at an outer circumference of the battery cell array is mounted, and a partition frame, at which a thermally bonded inner surplus portion of the battery cell array between the battery cells is mounted.

In addition, the outer frame of the cartridge frame may be provided with fastening parts protruding outward such that the fastening parts are coupled to an external device. Two or more fastening parts may be provided such that the fastening parts can be stably coupled to the external device.

The structure of each of the fastening parts is not particularly restricted so long as the fastening parts can be coupled to the external device. That is, each of the fastening parts may be formed to have various structures. For example, each of the fastening parts may be formed to have a structure including a protrusion protruding outward from the outer frame and a fastening hole formed through the protrusion. The fastening parts may be coupled to the external device by inserting bolts through the fastening holes.

Meanwhile, the secondary battery pack according to the present invention may be configured to have a structure in which the PCM having the PCB mounted in the PCM case is loaded on the thermally bonded surplus portions of the battery cells. At this time, a double-sided adhesive tape may be attached to an outside of the PCM such that the outside of the PCM is fixed to the thermally bonded surplus portions of the battery cells, thereby further improving structural stability of the secondary battery pack.

In addition, a hot melting process may be carried out for the PCM such that the PCM is mounted at the thermally bonded surplus portions of the battery cells in a securely fixed state.

In a concrete example, the battery cell array may be configured to have a structure including two battery cells. As previously described, these two battery cells may be arranged such that one side of one of the battery cells and one side of the other of the battery cells are adjacent to each other in a state in which the electrode terminals of the battery cells are disposed in the same direction. The battery cells arranged as described above may be connected in parallel to each other to increase the capacity of the secondary battery pack. As needed, on the other hand, the two battery cells may be connected in series to each other. In addition, three or more battery cells may be electrically connected to one another. In this case, the cartridge frame may include three or more battery cell location parts such that the number of the battery cell location parts of the cartridge frame may correspond to the number of the battery cells.

In a concrete example, the PCM case may surround the PCB excluding the external input and output terminal for easily protecting the PCB from external impact.

Meanwhile, a barcode label, into which production information, such as manufacturing company, manufacturing date, and type of the secondary battery pack, is input, may be attached to the outside of the sheathing label. According to circumstances, the barcode label may be formed on the outside of the sheathing label by printing.

The type of each of the battery cells is not particularly restricted. For example, each of the battery cells may be a lithium secondary battery having a large energy storage quantity per volume.

In accordance with another aspect of the present invention, there is provided a device including the secondary battery pack with the above-stated construction as a power source.

Representative examples of the device may include, but are not limited to, a mobile phone, a portable computer, a smart phone, a smart pad, a tablet PC, and a netbook computer.

The structure and manufacturing method of the device are well known in the art to which the present invention pertains and, therefore, a detailed description thereof will be omitted.

In accordance with a further aspect of the present invention, there is provided a method of manufacturing the secondary battery pack with the above-stated construction.

Specifically, the secondary battery pack may be manufactured using a method including (a) electrically connecting electrode terminals of two or more battery cells arranged side by side to an electrode terminal connection part formed at a PCB, (b) attaching a double-sided adhesive tape to an outside of a PCM case comprising a PCM case, in which the PCB is mounted, (c) bending the electrode terminals of the battery cells to mount the PCM at thermally bonded surplus portions of the battery cells, (d) fixing a battery cell array constituted by the battery cells, to which the PCM is connected, in a cartridge frame, (e) carrying out hot-melting for the PCM mounted at the thermally bonded surplus portions of the battery cells, and (0 wrapping a structure in which the battery cells, at which the PCM is mounted, is fixed in the cartridge frame with a label.

In the method of manufacturing the secondary battery pack according to the present invention, the battery cells are more stably loaded in the secondary battery pack than in a conventional method of manufacturing the secondary battery pack. Consequently, the structural stability of the secondary battery pack is improved.

Effects of the Invention

As is apparent from the above description, in the secondary battery pack according to the present invention, the battery cells are located in the cartridge frame such that the outer circumference of the secondary battery pack is protected by the cartridge frame, thereby improving structural strength of the secondary battery pack. In addition, when the battery cells are located in the respective battery cell location parts of the cartridge frame, the battery cells are isolated from each other to prevent interference between the battery cells, thereby improving safety of the secondary battery pack.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1:
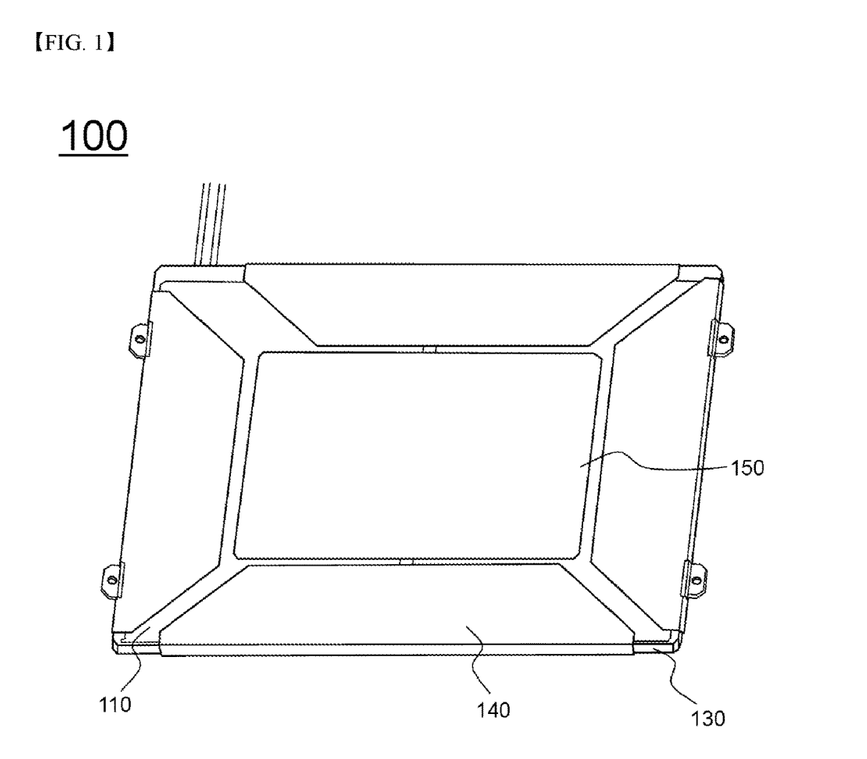
FIG. 1 is a typical view showing a secondary battery pack according to an embodiment of the present invention.
Figure 2:
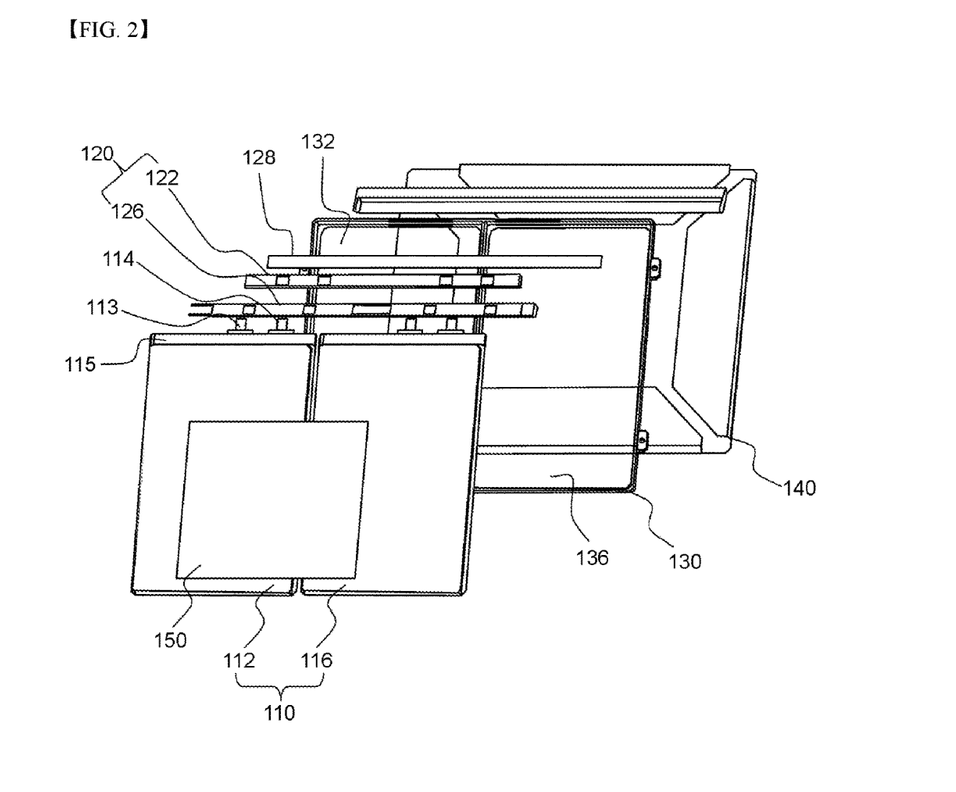
FIG. 2 is an exploded perspective view of the secondary battery pack shown in FIG. 1.

FIG. 1 is a typical view showing a secondary battery pack according to an embodiment of the present invention and FIG. 2 is an exploded perspective view of the secondary battery pack shown in FIG. 1.

Referring to FIGS. 1 and 2, the secondary battery pack 100 is configured to have a structure including a battery cell array 110, a protection circuit module (PCM) 120, a cartridge frame 130, and a sheathing label 140.

The battery cell array 110 is configured to have a structure in which two battery cells 112 and 116, each of which includes electrode terminals 113 and 114 formed at one side thereof and a thermally bonded surplus portion 115 formed at the side thereof at which the electrode terminals 113 and 114 are formed, are arranged side by side.

The PCM 120 is configured to have a structure including a protection circuit board (PCB) 122 having a protection circuit formed thereon and a PCM case 126, in which the PCB 122 is mounted. The PCM 120 is loaded on the thermally bonded surplus portions 115 of the battery cells 112 and 116 in a state in which the PCM 120 is electrically connected to the battery cells 112 and 116.

The battery cells 112 and 116 are configured to have the same structure. Each of the battery cells 112 and 116 is configured to have a plate-shaped rectangular structure. The battery cells 112 and 116 are arranged such that one side of the battery cell 112 and one side of the battery cell 116 are adjacent to each other in a state in which the electrode terminals 113 and 114 of the battery cells 112 and 116 are disposed in the same direction.

The cartridge frame 130 includes battery cell location parts 132 and 136 for fixing the two battery cells 112 and 116, respectively. The cartridge frame 130 is configured to have a frame structure for fixing the outer circumferences of the battery cells 112 and 116.

The sheathing label 140 is attached to the cartridge frame 130 such that the sheathing label 140 wraps the cartridge frame 130 in a state in which the battery cells 112 and 116, to which the PCM 120 is connected, are fixed in the cartridge frame 130.

Figure 3:
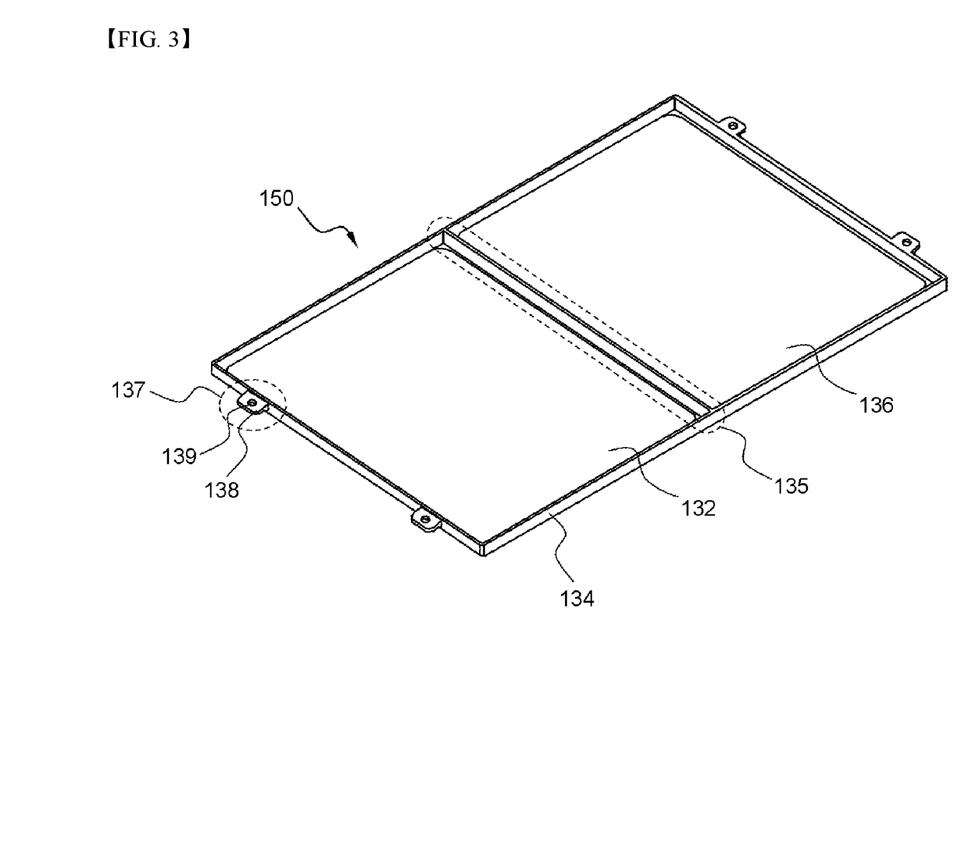
FIG. 3 is a perspective view of a cartridge frame shown in FIG. 2.

FIG. 3 is a perspective view of the cartridge frame shown in FIG. 2.

Referring to FIG. 3 together with FIG. 2, the cartridge frame 130 includes two battery cell location parts 132 and 136 for fixing the two battery cells 112 and 116, each of which is configured to have a plate-shaped rectangular structure, respectively.

Specifically, the cartridge frame 130 is configured to have a structure including a rectangular outer frame 134, at which a thermally bonded outer surplus portion positioned at the outer circumference of the battery cell array is mounted, and a partition frame 135, at which a thermally bonded inner surplus portion of the battery cell array between the battery cells 112 and 116 are mounted, such that the battery cells 112 and 116 arranged in a state in which one side of the battery cell 112 and one side of the battery cell 116 are adjacent to each other are mounted in the cartridge frame 130.

In addition, the outer frame 134 of the cartridge frame 130 is provided with fastening parts 137 protruding outward such that the fastening parts 137 are coupled to an external device (not shown). Each of the fastening parts 137 is configured to have a structure including a protrusion 138 protruding outward from the outer frame 134 and a fastening hole 139 formed through the protrusion 138. The fastening parts 137 are coupled to the external device by inserting bolts through the fastening holes 139.

FIGS. 4 to 10 are typical views showing a process of manufacturing the secondary battery pack shown in FIG. 1.

Figure 4:
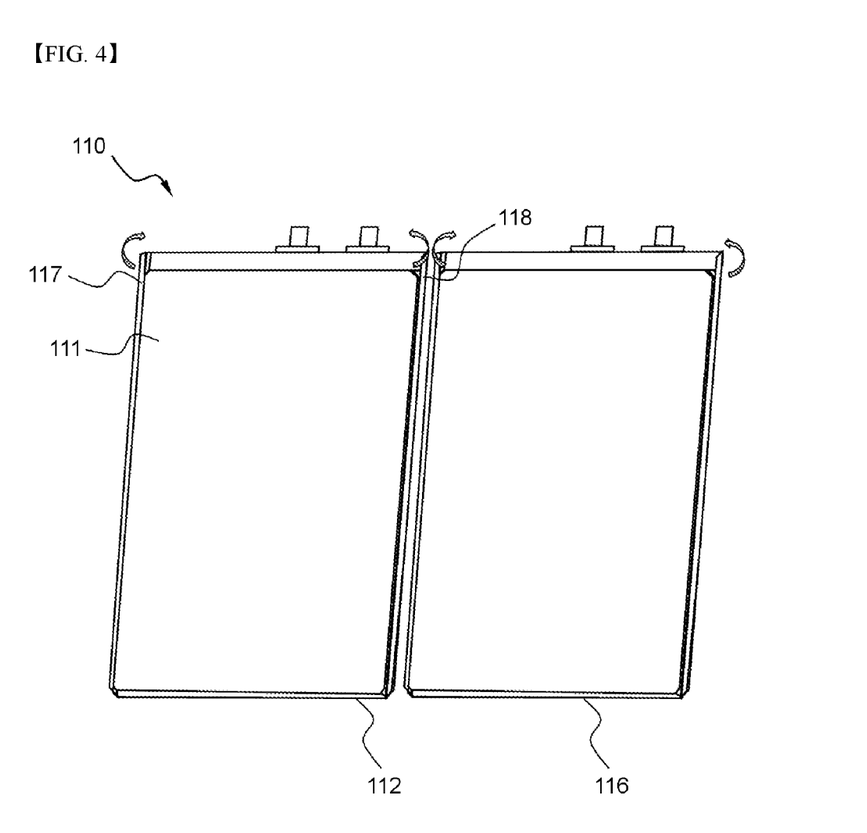
FIGS. 4 to 10 are typical views showing a process of manufacturing the secondary battery pack.

Referring first to FIG. 4, two battery cells 112 and 116 are arranged side by side to form a battery cell array 110. Each of the battery cells 112 and 116 is a pouch-shaped battery cell configured to have a structure in which an electrode assembly is mounted in a battery case made of a laminate sheet. Side sealed portions 117 and 118 of each of the battery cells 112 and 116 are perpendicularly bent such that the side sealed portions 117 and 118 faces a receiving part 111, in which the electrode assembly is received. As a result, each of the battery cells 112 and 116 has a compact structure.

Figure 5:
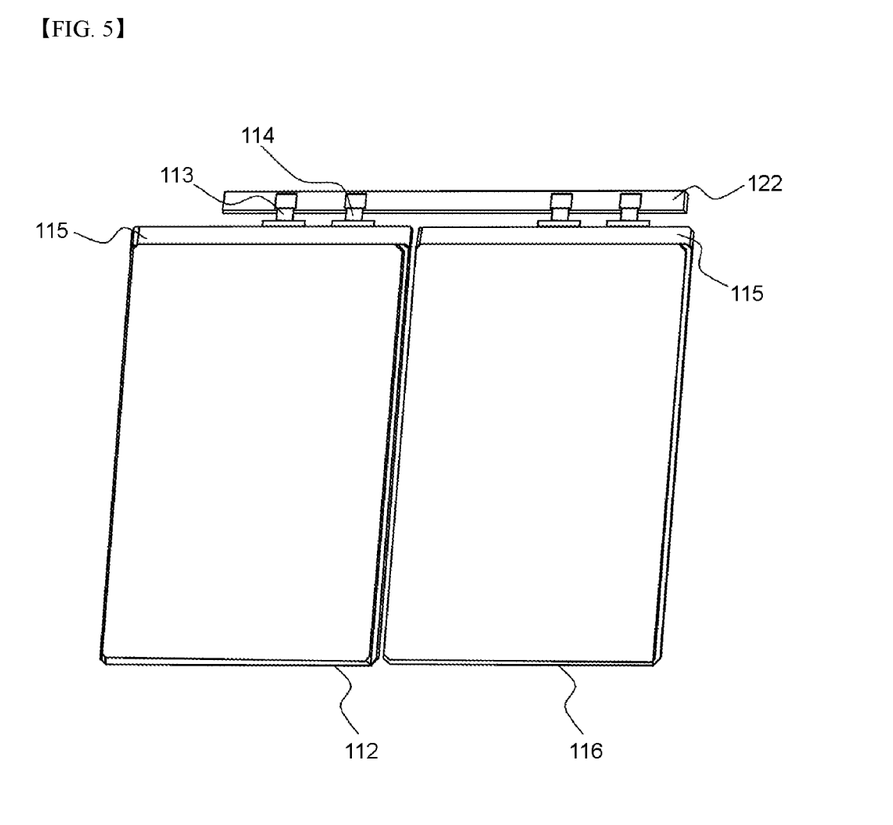

FIG. 5 shows a structure in which a PCB 122 is coupled to the battery cells 112 and 116 of FIG. 4. Referring to FIG. 5, the battery cells 112 and 116 are configured to have the same structure in which electrode terminals 113 and 114 are formed at one side of each of the battery cells 112 and 116. The cathode terminals 113 and the anode terminals 114 of the battery cells 112 and 116 are connected to the PCB 122 such that the battery cells 112 and 116 are connected in parallel to each other.

Figure 6:
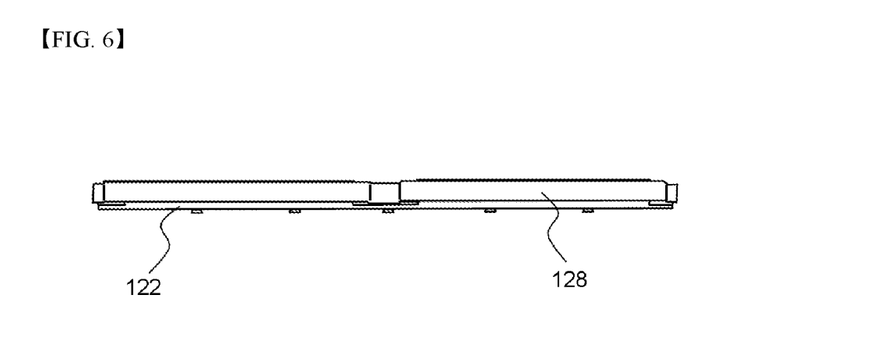
Figure 7:
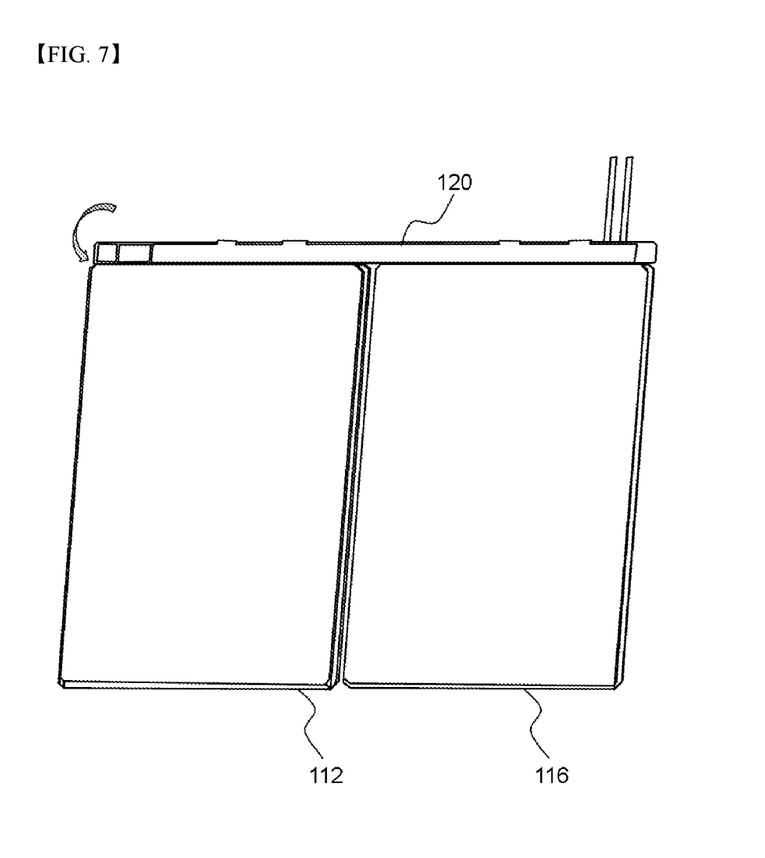

FIG. 6 is a typical view showing a PCM case and FIG. 7 is a typical view showing a structure in which a PCM case is mounted at the PCB structure of FIG. 5.

Referring to these drawings, a PCM case 126 is mounted at the PCB 122 such that the PCM case 126 surrounds the PCB 122 to protect the PCB 122. The PCM case 126 is mounted at the outside of the PCB 122 in a state in which the electrode terminals 113 and 114 of the battery cells 112 and 116 are connected to the PCB 122. In addition, the electrode terminals 113 and 114 of the battery cells 112 and 116 are bent such that the PCM case 126 is disposed at thermally bonded surplus portions 115 of the battery cells 112 and 116. At this time, a double-sided adhesive tape 128 is attached to the PCM case 126 such that the PCM case 126 is fixed to the thermally bonded surplus portions 115 of the battery cells 112 and 116.

Figure 8:
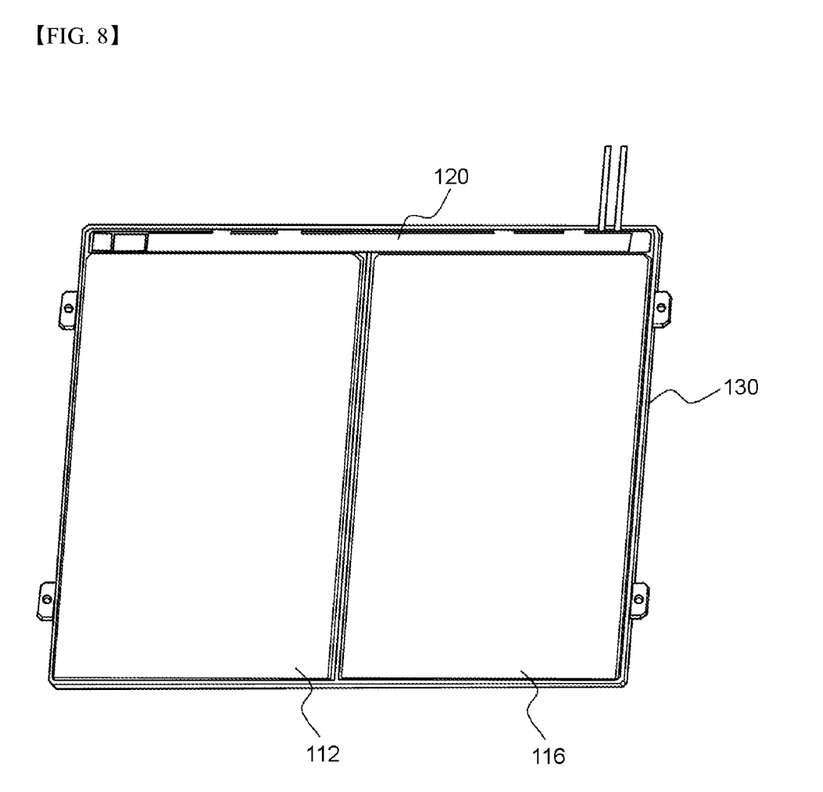
Figure 9:
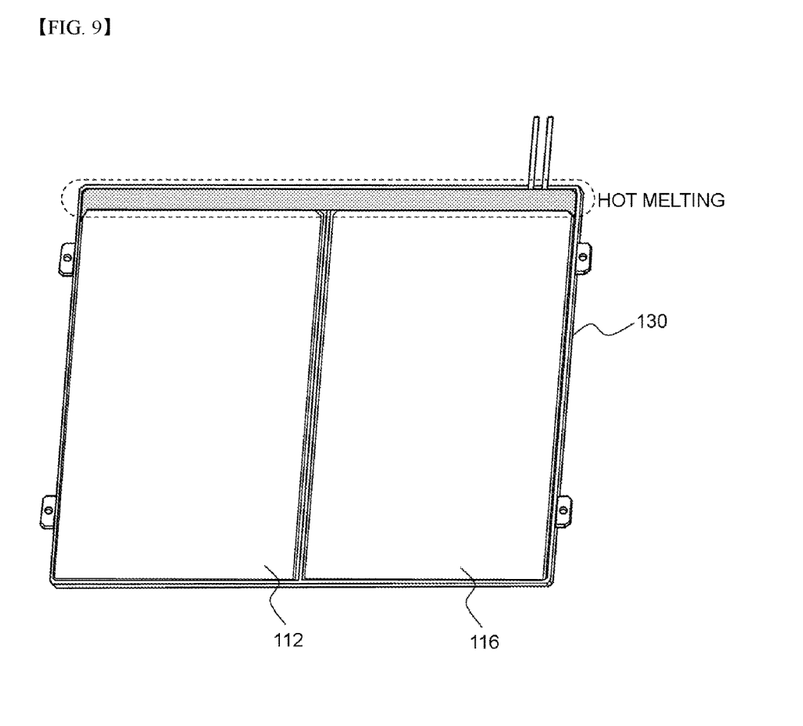

FIG. 8 is a typical view showing a structure in which a cartridge frame is mounted at the structure of FIG. 7 and FIG. 9 is a typical view showing a hot melting process carried out for the structure of FIG. 8.

Referring to FIGS. 8 and 9, the battery cells 112 and 116, to which the PCM 120 is connected, are mounted in a cartridge frame 130, configured to have a structure for fixing the two rectangular plate-shaped battery cells 112 and 116, a hot melting process is carried out for the PCM 120 such that the PCM 120 is mounted at the thermally bonded surplus portions 115 of the battery cells 112 and 116 in a securely fixed state and the PCM 120 is fixed to the cartridge frame 130.

Figure 10:
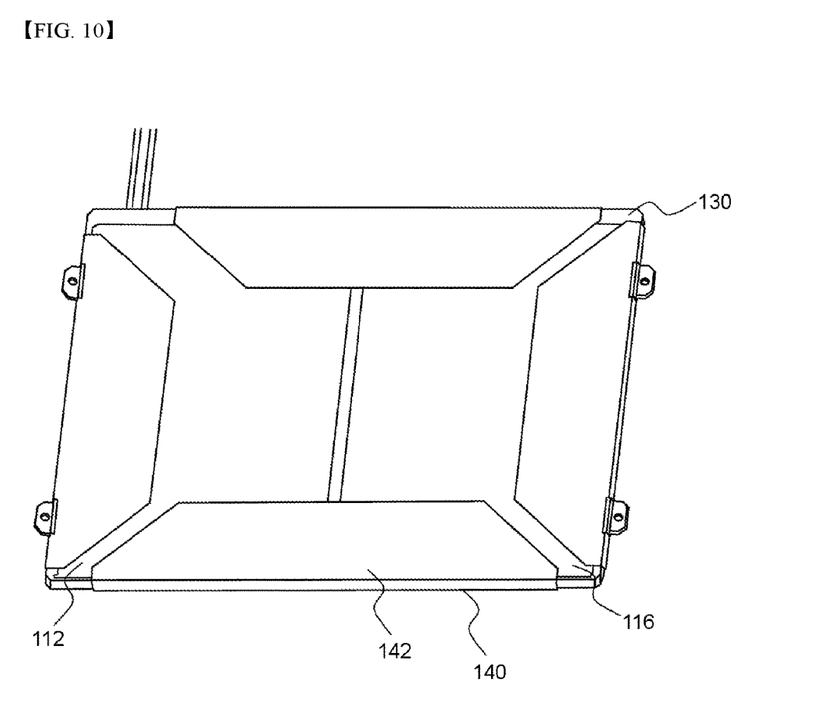

FIG. 10 shows a structure in which a sheathing label is attached to the structure of FIG. 9. Referring to FIG. 10, a sheathing label 140 wraps the entirety of one major surface of the cartridge frame 130, in which the battery cells 112 and 116 are mounted, and a portion of the other major surface of the cartridge frame 130. That is, the sheathing label 140 is attached to one major surface of the cartridge frame 130 and then outer extensions 142 of the sheathing label 140 are bent such that the outer extensions 142 of the sheathing label 140 are attached to the other major surface of the cartridge frame 130.

Finally, a barcode label 150 is attached to the structure of FIG. 10 to complete the secondary battery pack 100 of FIG. 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
a battery cell array configured to have a structure in which two or more battery cells, each of which comprises electrode terminals formed at one side thereof and a thermally bonded surplus portion formed at the side thereof at which the electrode terminals are formed, are arranged side by side;
a protection circuit module (PCM) configured to have a structure including a protection circuit board (PCB) having a protection circuit formed thereon, an external input and output terminal connected to the protection circuit of the PCB, and a PCM case, in which the PCB is mounted, the PCM being loaded on the thermally bonded surplus portions of the battery cells in a state in which the PCM is electrically connected to the battery cells;
a cartridge frame comprising two or more battery cell location parts for fixing the two battery cells, respectively, each of the battery cell location parts being formed in a frame shape corresponding to an outer circumference of a corresponding one of the battery cells; and
a single sheathing label attached to the cartridge frame such that the sheathing label wraps around ends of the cartridge frame in a state in which the battery cells, to which the PCM is connected, are fixed in the cartridge frame,
wherein the PCM mounted at the thermally bonded surplus portions of the battery cells is securely fixed to the thermally bonded surplus portions of the battery cells by hot melting to cover a surface of the PCM opposite a surface adjacent to the thermally bonded surplus portion.

2. The secondary battery pack according to claim 1, wherein each of the battery cells is configured to have a structure in which an electrode assembly is mounted in a case made of a laminate sheet comprising a metal layer and a resin layer and an outer circumference of the case is sealed.

3. The secondary battery pack according to claim 1, wherein the battery cells are configured to have the same structure.

4. The secondary battery pack according to claim 1, wherein each of the battery cells is configured to have a plate-shaped rectangular structure.

5. The secondary battery pack according to claim 4, wherein the battery cells are arranged such that one side of one of the battery cells and one side of another of the battery cells are adjacent to each other in a state in which the electrode terminals of the battery cells are disposed in the same direction.

6. The secondary battery pack according to claim 5, wherein the cartridge frame comprises an outer frame, at which a thermally bonded outer surplus portion positioned at an outer circumference of the battery cell array is mounted, and a partition frame, at which a thermally bonded inner surplus portion of the battery cell array between the battery cells is mounted.

7. The secondary battery pack according to claim 1, wherein the outer frame of the cartridge frame is provided with two or more fastening parts protruding outward such that the fastening parts are easily coupled to an external device.

8. The secondary battery pack according to claim 7, wherein each of the fastening parts comprises a protrusion protruding outward from the outer frame and a fastening hole formed through the protrusion.

9. The secondary battery pack according to claim 8, wherein the fastening parts are coupled to the external device by inserting bolts through the fastening holes.

10. The secondary battery pack according to claim 1, wherein a double-sided adhesive tape is attached to an outside of the PCM such that the outside of the PCM is fixed to the thermally bonded surplus portions of the battery cells.

11. The secondary battery pack according to claim 1, wherein the battery cell array comprises two battery cells.

12. The secondary battery pack according to claim 1, wherein the battery cells are connected in parallel to each other.

13. The secondary battery pack according to claim 1, wherein the PCM case surrounds the PCB excluding the external input and output terminal.

14. The secondary battery pack according to claim 1, further comprising a barcode label attached to an outside of the sheathing label.

15. The secondary battery pack according to claim 1, wherein each of the battery cells is a lithium secondary battery.

16. A device comprising a secondary battery pack according to claim 1 as a power source.

17. The device according to claim 16, wherein the device is selected from among a mobile phone, a portable computer, a smart phone, a smart pad, a tablet PC, and a netbook computer.

18. A method of manufacturing a secondary battery pack according to claim 1, the method comprising:
  (a) electrically connecting electrode terminals of two or more battery cells arranged side by side to an electrode terminal connection part formed at a PCB;
  (b) attaching a double-sided adhesive tape to an outside of a PCM comprising a PCM case, in which the PCB is mounted;
  (c) bending the electrode terminals of the battery cells to mount the PCM at thermally bonded surplus portions of the battery cells;
  (d) fixing a battery cell array constituted by the battery cells, to which the PCM is connected, in a cartridge frame;
  (e) carrying out hot-melting for the PCM mounted at the thermally bonded surplus portions of the battery cells; and
  (f) wrapping a structure in which the battery cells, at which the PCM is mounted, is fixed in the cartridge frame with a label.

* * * * *